(No Model.)

L. BUSH, Jr.

SAW SHARPENING MACHINE.

No. 315,715.                                Patented Apr. 14, 1885.

Witnesses:
Jno. H. Stockett.
C. C. Poole

Inventor.
Lewis Bush, Jr.
By M. E. Dayton
Attorney

(No Model.) 5 Sheets—Sheet 2.
L. BUSH, Jr.
SAW SHARPENING MACHINE.

No. 315,715. Patented Apr. 14, 1885.

Witnesses.
Inventor
Lewis Bush, Jr.
By
W. E. Dayton
Attorney (No Model.)  5 Sheets—Sheet 3.

L. BUSH, Jr.
SAW SHARPENING MACHINE.

No. 315,715. Patented Apr. 14, 1885.

Witnesses:
Jno. W. Stockett.
C. C. Poole

Inventor
Lewis Bush, Jr.
By
M. E. Dayton
Attorney

N. PETERS, Photo-Lithographer, Washington, D.C.

(No Model.)  5 Sheets—Sheet 4.

L. BUSH, Jr.
SAW SHARPENING MACHINE.

No. 315,715.  Patented Apr. 14, 1885.

(No Model.) 5 Sheets—Sheet 5.
L. BUSH, Jr.
SAW SHARPENING MACHINE.

No. 315,715. Patented Apr. 14, 1885.

Witnesses:
Jno. H. Stockett.
C. C. Poole

Inventor:
Lewis Bush, Jr.
By M. E. Dayton
Attorney

UNITED STATES PATENT OFFICE.

LEWIS BUSH, JR., OF CHICAGO, ILLINOIS, ASSIGNOR TO THE AMERICAN MACHINERY COMPANY, OF SAME PLACE.

SAW-SHARPENING MACHINE.

SPECIFICATION forming part of Letters Patent No. 315,715, dated April 14, 1885.

Application filed December 13, 1883. (No model.)

*To all whom it may concern:*

Be it known that I, LEWIS BUSH, Jr., of Chicago, in the county of Cook and State of Illinois, have invented certain new and useful Improvements in Saw-Sharpening Machines; and I do hereby declare that the following is a full, clear, and exact description thereof, reference being had to the accompanying drawings, and to the letters of reference marked thereon, which form a part of this specification.

One object of this invention is to provide means in saw-sharpening machines for inclining or beveling the edges of the alternate saw-teeth in opposite directions. Another object is to generally improve the construction and operation in that class of saw-sharpening machines having a rotary grinding-disk, and which are provided with means for giving a combined reciprocatory and rotary movement to the saw, as will hereinafter appear; and it consists in the matters hereinafter described, and pointed out in the claims.

In the accompanying drawings, Fig. 5 is a detail section taken upon line $y\,y$ of Fig. 2.

The main frame of the machine, upon which the several operative parts thereof are mounted, consists, as illustrated in the drawings, of a horizontal top or bed plate, A, four supporting standards or legs, A', placed at each corner thereof, and a rectangular casting, $A^2$, attached to the legs A' in a horizontal position near the lower ends thereof.

B is a grinding-disk, which is mounted upon a rotating arbor, B', having bearings in boxes $B^2$, which are supported from one end of the plate A above the horizontal upper surface of the said plate, as hereinafter more particularly described.

The saw to be sharpened (indicated by C in the drawings) is supported above the top of the plate A in a horizontal position, the axis of the grinding-disk B being located substantially in the same horizontal plane with the saw and in proper position to operate upon the teeth thereof. The saw C is held by a suitable fastening device upon an arm, D, which is pivotally attached at one end to a sliding plate, E, arranged horizontally above the bed-plate A of the machine, and supported at its sides in a guide plate or casting, F, bolted to said bed-plate. The plate E is reciprocated horizontally for the purpose of advancing the saw periodically to the grinding-disk as it is rotated by feeding mechanism, hereinafter described, by means of a crank-pin, $g$, which is secured, as shown more clearly in Fig. 5, to a disk, G', upon the upper end of a vertical shaft, G, and which engages a transverse slot, $e$, in a plate, E', secured to the said plate E. The shaft G is, as shown, actuated from the main driving-shaft H of the machine, which is provided with a driving-pulley, $h$, and is supported in a position transverse to the shaft G in suitable bearings upon the casting $A^2$, and has operative connection with said shaft by means of a gear-wheel, $G^2$, and a worm-gear, $h'$, secured upon the shafts G and H, respectively. The gear-wheel $G^2$, as herein shown, is loosely mounted upon the shaft G, and connected therewith by a friction-clutch, $G^4$. The arm D, to which the saw is attached, is pivotally connected with the plate E at one end by means of a bolt, $d$, passing through an aperture in said arm, and secured in said plate, the bolt being preferably threaded at its lower end, and inserted in a correspondingly-threaded aperture in the plate E, so that the arm may be thereby clamped firmly upon the plate at any desired angle. The saw is secured to the arm D in such manner as to permit it to be adjusted longitudinally thereon, the attachment preferably being made by means of a bolt or pin, $d'$, engaged with the eye of the saw, and secured in a longitudinal slot, $d^2$, in the said arm.

By the construction above described the center of the saw may obviously be located at any point within the circle described by the outer end of the arm D, and may thus be placed at any position with reference to the grinding-disk necessary in grinding teeth of different shape, and in placing saws of different sizes upon the machine.

The portion $D'$ of the arm D, at its end which is secured to the plate E, is preferably enlarged and of circular form, and is constructed to fit upon a corresponding circular surface, $E^2$, upon the said plate, the bolt $d$ being placed at the center of said circular part. By this construction a considerable area of contact is obtained between the part $D'$ and the plate E, whereby the liability of the arm being moved under strain thereon is lessened.

As an additional means of securing the arm D from rotary movement upon the pivot-bolt $d$, the circular portion $E^2$ of the plate E may have cast upon it an upwardly-projecting portion or lug, $e^7$, located at a point adjacent to the edge of the circular portion $D'$ of the arm D, a set-screw, $e^8$, being inserted through a threaded aperture in said lug and constructed to bear at its inner end against the periphery of the said part $D'$.

In the device shown for holding the saw C upon the arm D the bolt $d'$ passes upwardly through a short tube or thick washer, $d^3$, placed upon said arm and adapted to support the weight of the saw, and upon the upper end of the said bolt, above the saw, is placed a hollow truncated cone, $d^4$, with its smaller end downward, and within the central aperture of the saw, a thumb-nut, $d^5$, being placed upon the said bolt above the conical piece $d^4$, and operating to force said conical piece downward into the aperture in the saw, so as to give a requisite pressure thereon to hold the saw firmly in contact with the washer $d^3$, whereby the saw may be held from rotation, as is found desirable or necessary in the operation of the feeding device.

The devices above mentioned for holding the saw upon the arm D are illustrated in a patent for which application was filed by me June 1, 1883, and allowed October 22, 1883, and such devices are not, therefore, claimed in this patent.

In order to provide means for controlling or adjusting the position of the periphery of the saw with reference to the grinding-disk and for feeding the saw forward during the operation of sharpening the saw-teeth for the purpose of causing the said disk to cut deeper as the metal thereof is ground away, the plate $E'$, which is engaged by the crank-pin $g$, as before stated, is attached by sliding connections to the plate E, and is held in position relatively thereto by means of an adjusting-screw, $E^3$, arranged longitudinally of the machine-frame. The said adjusting-screw as herein illustrated is provided with a collar, $e'$, which engages a notch formed between two depending lugs, $e^2$, upon the plate E, and with a threaded portion, $e^3$, engaging a threaded aperture in a lug, $e^4$, upon the plate $E'$, the shaft of said adjusting-screw being arranged to project at the rear end, or end of the table opposite the point at which the grinding-disk is located, and being provided with a hand-wheel, $E^4$, upon said projecting end, by which the screw may be turned.

The plate $E'$ (shown more clearly in Fig. 6 of the drawings) is held at its edges in guide-grooves $e^5$, formed upon the lower face of the plate E, an adjustable strip, $e^6$, being placed between the edge of the said plate $E'$ and the guide-groove at one side thereof, for the purpose of taking up any lost motion which may be occasioned by the wear of the parts.

By means of the device above described for adjusting the plate E the saw may be moved toward the grinding-disk while being reciprocated and as it is ground away until the necessary amount of material has been removed therefrom to bring the saw-teeth to the required size or to make them sufficiently sharp. This adjustment may be accomplished without stopping the machine, the necessary amount of movement being readily determined by watching the effect of the grinding-disk upon the saw during the time that the adjusting-screw is being operated.

As an improved construction in the devices for producing the rotary feed movement of the saw necessary to bring the teeth in succession to the action of the grinding-disk, said devices are made as follows:

Above the bed-plate A of the machine-frame, and preferably at the end thereof adjacent to the grinding-disk, is located a feed-finger, I, which is arranged tangentially with reference to the periphery of the saw, is constructed to engage the saw-teeth at one end, and is pivotally connected at its opposite end with the free end of an oscillating arm, J, pivoted to the said bed-plate. The pivotal connection between the said feed-finger and the arm J is so constructed that the former may swing freely in a horizontal plane, so that its free end may pass over the teeth of the saw as it is reciprocated and engage the teeth in succession, a suitable spring being applied to keep the said free end of the finger in contact with the saw.

The feed-finger, as herein shown, is located slightly below the plane of the saw, and is provided upon its free end with an upwardly-projecting pin, $i$, which engages the saw-teeth. The oscillating arm J is arranged, generally, at right angles to the feed-finger, which is pivoted to the free end thereof, as before stated, and the said arm is pivoted at its opposite end to a lug, $j$, upon the bed-plate A, in such manner that the said arm may be oscillated horizontally over the bed-plate, and the feed-finger thereby reciprocated for the purpose of rotating the saw. Motion is given to the arm J by means of a cam-plate or form-block, K, which is arranged to slide upon the bed-plate, and is reciprocated in a direction generally at right angles to the direction of motion of the free end of the arm J by devices hereinafter described, said block being provided with a cam-surface, K', constructed to engage the said arm, and which operates to give to it the desired oscillatory movement during the reciprocatory movements of the block.

As herein shown, and as preferably constructed, the cam-plate or form-block K is attached to and is constructed to move with a sliding plate, L, which is supported upon the machine-frame, and is moved by means of an eccentric, M, upon the shaft G, having connection with the said frame L through the medium of a connecting-rod or pitman, N.

Figures 7, 8, 9, 10, 11, 14, 15:
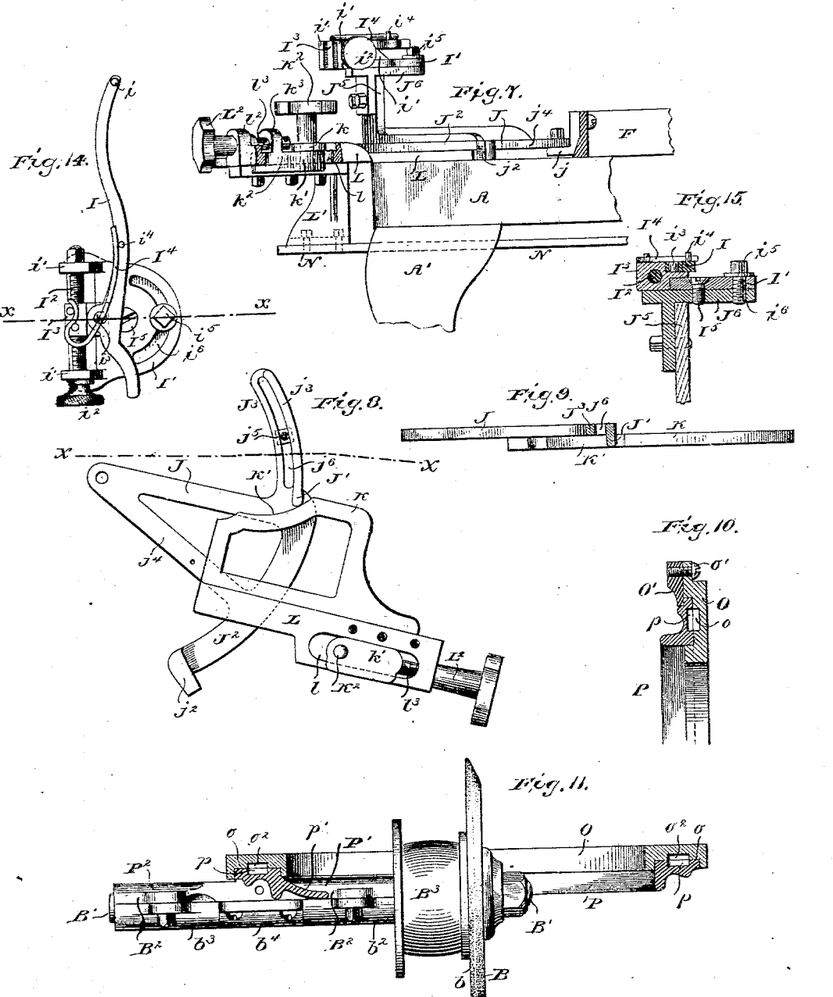
Fig. 7 is a detail side view of the saw-feeding devices.
Fig. 8 is a view from beneath of a portion of the saw-feeding device, which will be hereinafter more particularly described.
Fig. 9 is a detail sectional view taken upon line $x\,x$ of Fig. 8.
Fig. 10 is a detail sectional view taken upon line $x\,x$ of Fig. 3.
Fig. 11 is a detail sectional view taken upon line $y\,y$ of Fig. 3.
Fig. 14 is a detail plan view of the feed-finger and connections.
Fig. 15 is a detail section taken upon line $x\,x$ of Fig. 14.
Figure 16:
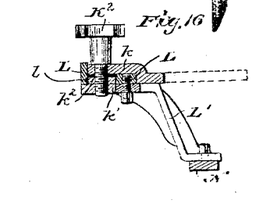
Fig. 16 is a detail section taken upon line $z\,z$ of Fig. 2.

The sliding plate L is, as herein illustrated, constructed to rest upon the upper surface of the bed-plate A of the table, and is held from lateral movement by a guide or stop, $A^3$, bolted to the said bed-plate, and the said plate is bolted to a vertical arm or casting, L', which extends downwardly from its under side in its portion which projects beyond or outside of the plate A, as shown more clearly in Figs. 7 and 16. The casting L' is bolted to or otherwise connected with the end of the pitman N, which is preferably located below and parallel with the bed-plate A, the eccentric M, as shown, being placed upon said shaft below the upper bearing, $G^3$, thereof.

The arm J is, as herein shown, located above the sliding plate L and form-block K, and the said arm J is provided with a downwardly-projecting portion or lug, J', constructed to engage the cam-surface K' of the form-block, the said cam-surface being constructed to throw the arm J laterally when the form-block is moved longitudinally by the reciprocatory movement given to the plate L from the eccentric M.

The construction last described is shown more plainly in Fig. 8 of the drawings, which shows the arm J, the block K, and plate L detached from the machine and reversed or viewed from beneath.

As shown, and as preferably constructed, the arm J is provided upon its free end with lateral segmental or curved projections $J^2$ and $J^3$, said projections being provided, respectively, with downwardly-projecting parts or lugs $j^2$ and $j^3$, constructed to rest upon the upper surface of the bed-plate A at either side of the form-block K and sliding plate L, and to thereby support the said arm free from contact with the said form-block and plate.

The segmental part $J^2$ is, as herein shown, connected with the arm J at its pivotal point by means of an arm or brace, $j^4$, and the downwardly-projecting portion $j^5$ preferably forms a continuation of the downwardly-projecting lug J', which engages the cam-face of the form-block. The free end of the arm J may be retained by gravity in its horizontal position, with the downwardly-projecting portions thereon in contact with the upper surface of the bed-plate A; but such arm may be held in place, if found necessary, by means of a headed bolt, $j^5$, inserted through a curved slot, $j^6$, in the part $J^3$ of the arm and secured in the said bed-plate, the slot $j^6$ being curved concentrically with the pivotal point of the arm.

The form-block K may be rigidly attached to the plate L, or the said form-block may be attached directly to the arm or bracket L'; but as a preferred construction, and as herein illustrated, the block K is adjustably connected with the plate L, means being provided for moving the said block upon the plate in the direction of the reciprocation of said block, this adjustment being for the purpose of varying the movement of the feed-finger in producing teeth of different shapes and sizes.

Figure 1:
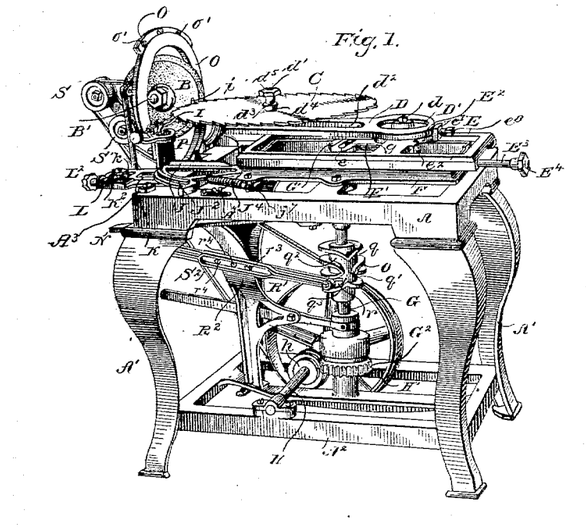
Figure 1 is a perspective view of a machine embodying my invention.
Figure 2:
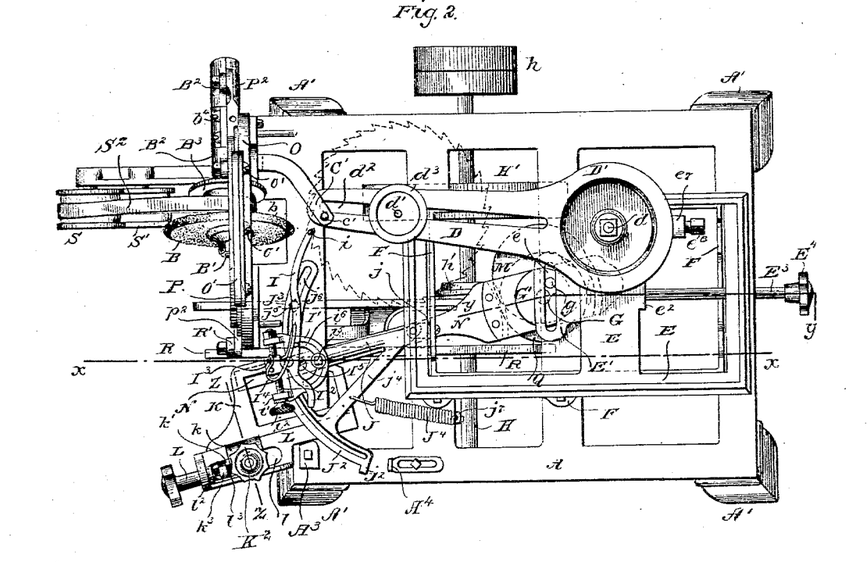
Fig. 2 is a plan view of the same.

As herein shown, the form-block K is located in the same plane with the plate L and edge to edge therewith, the block being provided upon its edge adjacent to the plate with a lug or projection, $k$, Figs. 2, 7, and 16, constructed to overlap the plate, and secured thereto by means of a thumb-screw, $K^2$, which passes through an aperture in said lug, and also through a slot, $l$, in the plate L, and is inserted in a threaded aperture in a plate, $k'$, upon the side of the plate L opposite the lug. The plate $k'$ is preferably provided with an upwardly-projecting lip or flange, $k^2$, which is fitted in the slot $l$ and adapted to slide therein. By this construction the form-block may be securely clamped to the plate L and adjusted in any desired position with reference to the projection J', the slot $l$ being made of sufficient length to permit a necessary amount of movement in the cam-block.

In order to provide means for accurately and readily adjusting the cam-block K with reference to the plate L, an adjusting-screw, $L^2$, may be arranged to connect said block and plate, so as to give a relative movement to the two parts mentioned. As preferably constructed, said adjusting-screw is held at its outer end in a bearing, $l^2$, Figs. 2 and 7, upon the plate L, in such manner as to prevent longitudinal movement in said screw, and the threaded portion $l^3$ of said screw is constructed to engage a suitable threaded aperture in a lug, $k^3$, upon the plate $k'$, to which the block K is secured by the thumb-screw $K^2$, as above described.

The projection J' upon the arm J may be kept in contact with the curved edge of the form-block during the reciprocation thereof by means of a spring or weight connected in any suitable manner with the said arm and the machine-frame, and arranged to throw the free end of said arm laterally and toward the form-block.

As shown in the drawings, a coiled spring, J⁴, is applied for this purpose, such spring being secured to the arm $j^4$ and to a lug or projection, $j^7$, upon the bed-plate A of the machine. A stop, A⁴, is adjustably secured to the bed-plate in position to be encountered by the projection J², for the purpose of limiting the movement of the arm under the action of the spring.

In the operation of sharpening saws in the machine described the saw-teeth are preferably ground on both edges, the advance edges being operated upon during the approach of the saw to the grinding-disk, and the back edges during the receding movement and while the saw is being rotated, so as to bring the next tooth into position to be operated upon by the grinding-disk. The shape of the back of the tooth is therefore determined by the relative movements of the feed-finger and devices for reciprocating the saw, and the reciprocating movement of the saw being constant in the machine shown, the form of the backs of the teeth is determined by the motion given to the feed-finger by the action of the form-block upon the projection J'. In the present machine the form-block is caused to reciprocate transversely to the path of the pivotal point of the feed-finger, and the motion given to the feed-finger is thus entirely dependent upon the form of the block. The outline of the block is preferably made of such shape as to give the general form of tooth desired, such shape being determined by experiment, and the general position of any particular part of the curve given by the said form-block may be changed in forming different teeth and teeth of different sizes by moving the form-block relatively to the projection J', in the manner described. This movement of the block, as will be seen more clearly from an inspection of Fig. 8 of the drawings, causes the projection J' to pass over different parts of the curved edge with which said projection is in contact, and to thereby give a greater or less lateral movement, according to the shape of the different parts of the edge traversed by it. The form of the curved face may obviously be changed by filing or otherwise removing the portions of the face when a metal block is used, or by the substitution of different blocks.

Instead of a metal block, the use of a wooden block is contemplated in cases where desirable, such block being readily changed in form and cheaply made, and having been found to be sufficiently durable to be of practical utility.

As a preferable means of connecting the feed-finger I with the arm J, the said arm is provided upon its end with a standard or bracket, J⁵, having bolted upon its upper end a horizontal plate, J⁶, (shown more clearly in Figs. 14 and 15,) to which is pivoted a plate, I', provided upon one edge with lugs $i'$, which afford bearings for the ends of a screw-shaft, I², as shown in said figures. The said screw-shaft is provided with a milled head, $i^2$, by which it may be rotated, and passes through a block, I³, upon which the feed-finger I is pivoted by means of a pivot-pin, $i^3$. The said block I³ is located between the lugs $i'$, and slides in contact with and is guided and held from rotation by the edge of the plate I' (which is parallel with said screw-shaft) and the upper horizontal surface of the plate J⁶. By rotating the screw-shaft I² the block I³ may be moved longitudinally thereof, and the free end of the feed-finger may be thereby adjusted accurately, according to the size of the saw-teeth and position of the saw.

For the purpose of retaining the ends of the feed-finger in contact with the periphery of the saw, a spring, I⁴, is secured to the upper surface of the block I³, and is connected with said feed-finger, so as to throw it inwardly toward the center of the saw. Such spring, as shown, consists of a wire secured at its end between two studs upon the block I³, and constructed to rest at its free end against a stud, $i^4$, secured in the upper surface of the feed-finger between the pivotal point thereof and its free end.

The plate I' is, as herein shown, pivotally connected with the plate J⁶ by means of a pivot bolt or screw, I⁵, Figs. 14 and 15, and a clamp-bolt, $i^5$, which latter bolt passes through a curved slot, $i^6$, in said plate concentric with the pivot-bolt I⁵, and is secured in the plate J⁶.

By means of the clamp-bolt $i^5$ the plate I' may obviously be secured at any angle desired with reference to the arm J, the object of this adjustment being to permit the angle at which the feed-finger bears to the periphery of the saw to be varied as is found desirable or necessary in operating upon the teeth of different sizes and shapes.

In order to provide means in saw-grinding machines for beveling the front or cutting edges of the saw-teeth, I make the supports for the grinding-disk and the saw relatively movable in such manner that the grinding-face of the disk may be inclined relatively to the plane of the saw. In applying this part of the invention to grinding-machines of the general character above described, the grinding-disk is preferably mounted in movable supports, constructed to permit the axis of the disk to be inclined with reference to the plane of the saw, said supports preferably being secured to a frame which is pivotally connected with the machine-frame, and means actuated by the operative parts of the machine being provided for oscillating said frame about its pivotal axis, so as to cause the angle of the grinding-disk with reference to the plane of the saw to be changed, and to bring the grinding face or surface of said disk alternately at opposite angles with reference to the edges of the saw-teeth as each tooth is brought in succession to the grinding-disk by the action of the feed mechanism.

For the purpose of changing the relative angles of the plane of the saw and grinding-disk, the latter is preferably rotated upon an axis lying in the grinding-face of the disk, which operates upon the advance or cutting edges of the tooth, whether such grinding-face be cylindrical, conical, or plane, the axis of rotation in either case, when the saw is placed horizontally, being horizontal and in line with the cutting-edge of the tooth which is being ground. As herein shown, and as preferably constructed, however, the front or straight cutting-edges of the teeth are operated upon by the portion of one of the flat faces of the grinding-disk adjacent to the margin thereof, and the center of said flat face is located in the same horizontal plane with the saw, the axis of the grinding-disk mandrel being swung in a vertical plane about a horizontal axis transverse to the axis of the mandrel, and which passes through the center of the said face of the disk, and is in line with the advanced or cutting edge of a tooth which is being operated upon.

One form of construction in devices for mounting the bearing-boxes of the grinding-disk arbor or mandrel in which the last-mentioned conditions are preserved is illustrated in Figs. 1, 2, 3, 4, 10, and 11 of the accompanying drawings, and is as follows:

Upon the end of the bed-plate A adjacent to the grinding-disk, and rigidly secured to said plate, is an annular ring or plate, O, located in a vertical plane transverse to the plane of rotation of the grinding-disk, and parallel with a vertical plane passing through the axis of the arbor of said disk.

Upon the stationary ring O is secured a second movable ring, P, the center of which is in the same horizontal plane as the saw C. To said ring P the bearings $B^2$ of the arbor B' are attached, said bearings being located at diametrically-opposite points upon the ring, so that the axis of the mandrel passes through the axis of rotation of the ring, and the grinding-disk is supported centrally with reference to said ring. The grinding-disk B is, as shown, secured to the mandrel B', with the center of its face $b$, by which the cutting-edges of the teeth are ground, in line with the axis of rotation of the ring P, so that when the said ring is rotated the disk will be turned about a horizontal axis lying in the said face $b$. The ring P may be secured to the ring O so as to rotate thereon in any desired manner; but as preferably constructed, and shown more clearly in Figs. 10 and 11, the ring O is provided with an annular groove, $o$, in its face, in which the ring P is constructed to fit, segmental plates O' being secured, by screws $o'$ or otherwise, to the ring O at the upper and lower portions thereof, and constructed to overlap the ring P, and thereby hold it securely in the groove $o$. The face of the groove $o$ is preferably provided with an annular recess, $o^2$, and the ring P with a corresponding recess, $p$, the object of this construction being to reduce the area of contact between the rings O and P, and to thereby lessen the frictional resistance when one is moved upon the other. One half of each of the bearing-boxes $B^2$ of the disk-mandrel are preferably cast integral with the ring P, as indicated at P' and $P^2$, an inwardly-projecting portion or flange, $p'$, being formed between and connecting the said ring with the inwardly-projecting part P' of the box, in order to give rigidity to the parts. Two boxes are preferably used in order to give sufficient bearing for the arbor B', one of said boxes being formed by means of a cap, $b^2$, secured to the part P', and the other box being formed by a similar cap, $b^3$, secured to the part $P^2$, which projects outside of the ring P, and the space between said boxes is preferably utilized for an oil-box, $b^4$, by which both bearings are lubricated. The arbor B' is, as shown, provided with a driving-pulley, $B^3$, located upon said arbor adjacent to the flat face $b$ of the grinding-disk and between said disk and the bearing $B^2$, the grinding-disk being actuated by a suitable belt placed over said driving-pulley, as hereinafter more particularly described.

In order to provide means for automatically grinding the cutting-faces of the alternate teeth with a bevel in opposite directions, as above mentioned, it is necessary to rotate the disk-arbor, so as to change the angle of the grinding-disk with reference to the saw as each tooth is presented to the said disk, and for this purpose the ring P is preferably given a partial rotation at each advance movement of the saw by means of operative connections between said ring and the vertical shaft G of the machine.

Figures 3, 6, 12, 13:
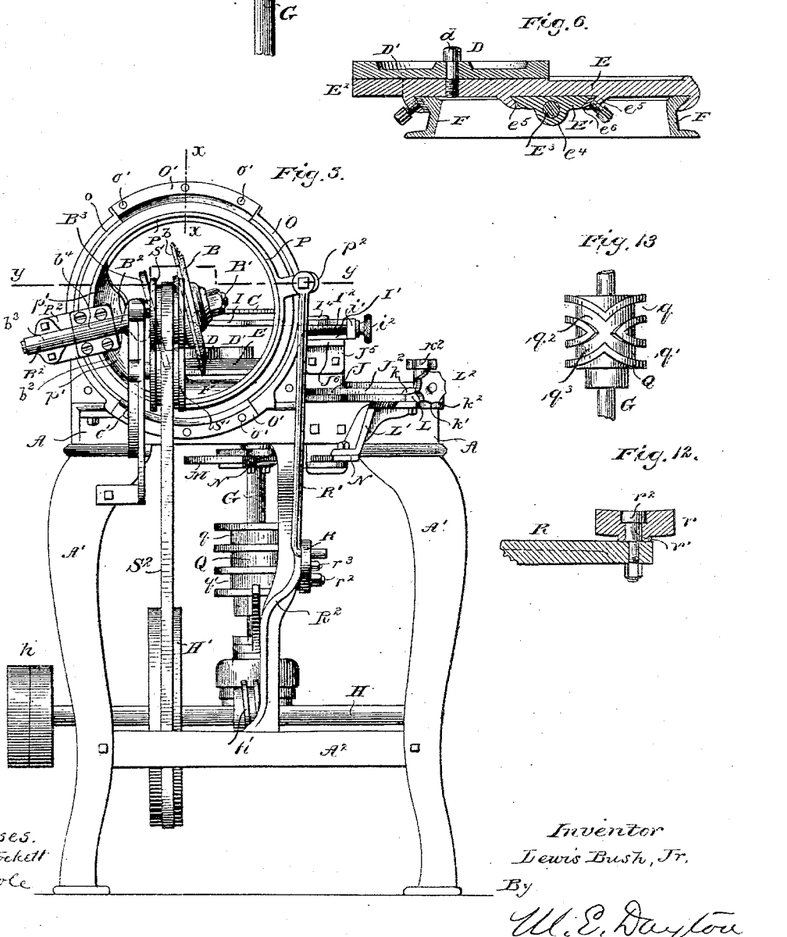
Fig. 3 is a front or face view of the same.
Fig. 6 is a detail section taken upon line $x\,x$ of Fig. 5.
Fig. 12 is a detail sectional view taken upon line $x\,x$ of Fig. 4.
Fig. 13 is a detail view of the grooved cam shown in Figs. 1 and 4.

The shaft G (which is constructed to give a reciprocating motion to the saw, as above mentioned) makes a complete rotation at each advance movement of the saw, and it is necessary, therefore, to partially rotate the ring P, for the purpose above stated, once at each rotation of the said shaft. As a preferable means of actuating said ring from the shaft G, said shaft is provided with a cam, Q, of general cylindrical form, and having a double cam-groove formed of two parts, $q$ and $q'$, which are parallel with each other in horizontal planes and vertically separated, the parts of the grooves being connected by inclined portions $q^2$ and $q^3$. (Shown more clearly in Fig. 4.) The said inclined portions are arranged to connect the upper groove, $q$, with the lower groove, $q'$, upon the same side of the cam, and cross each other at the same angle at a point intermediate of said grooves. The cam-grooves are engaged by a suitable projection upon one end of a lever, R, which is pivoted intermediately of its ends to a stationary part of the machine-frame, and is pivoted so as to swing in a vertical plane generally tangent to the cylindrical cam Q. The said lever is preferably connected with the ring P by means of a pitman, R′, attached to the outer end of said lever and pivotally connected with a lug, $p^2$, upon said ring. The end of the lever R which engages the cam Q is provided with an elongated block or button, $r$, which is pivoted to the said arm and formed of the same width as and constructed to fit and slide in the grooves $q$ and $q'$. The button $r$ is made of slightly greater length than the width of the grooves in the cam G, and is curved near its ends, so as to pass freely around the curves of the said grooves. The said button is, as shown in Fig. 12, pivoted to the lever R by means of a pivot-pin, $r'$, secured in the said lever, and provided with an enlarged portion or head, $r^2$, by which the button is held upon the pin. The button described, being longer than the width of the cam-groove, is, when the cam is rotated, caused to follow the said cam-groove in its inclined portions $q^2$ and $q^3$ and to pass the point of intersection of said inclined portions without tendency to leave the one in which it is traveling.

The purpose of the construction described in the cam-grooves is to cause the end of the lever adjacent to the cam to be thrown upward and held at the upper limit of its movement during one rotation of the shaft G, and to be carried downwardly and held at the lower limit of the movement during the next rotation thereof, this movement of the lever being for the purpose of causing the grinding-disk to be thrown into oppositely-inclined positions during the contact of the alternate teeth with the said disk. This result, as will be observed, is perfectly obtained by the construction described in the cam Q and the button upon the lever R, the said button being caused to pass alternately either from the lower to the upper groove or from the upper to the lower groove at each rotation of the shaft and at each successive approach of the saw to the grinding-disk.

The lever R is, as herein illustrated, pivotally connected with a casting or bracket, $R^2$, upon the machine-frame by means of a pivot-bolt, $r^3$, inserted through one of a series of apertures, $r^4$, in the said lever, and secured in one of a corresponding series of apertures in the bracket $R^2$, this construction permitting the pivoted axis or fulcrum to be moved so as to change the relative lengths of the arms of the lever, and to thereby vary the amplitude of the oscillations of the ring P, and consequently the inclination of the beveled faces of the saw-teeth.

In the device shown in the several figures mentioned the driving-pulley $B^3$ is placed upon the mandrel B′ adjacent to the face $b$ of the grinding-disk, so that a very slight vertical movement only occurs in said pulley when the frame P is oscillated. This motion is so slight that it is entirely practicable to actuate the grinding-disk by a driving-belt extending from a driving-pulley located in any position with reference thereto. A more perfect result may be obtained, however, by the construction shown in said figures, two idlers, S and S′, being therein illustrated as located, respectively, with their upper surfaces in the same horizontal plane with the upper and lower surfaces of the periphery of the pulley $B^3$, a belt, $S^2$, being arranged to pass around the three pulleys mentioned, and over a pulley, H′, secured upon the driving-shaft H of the machine.

As shown in the figures above referred to, the ring P is located upon the outer face of the ring O, or that adjacent to the idlers S and S′.

Figure 17:
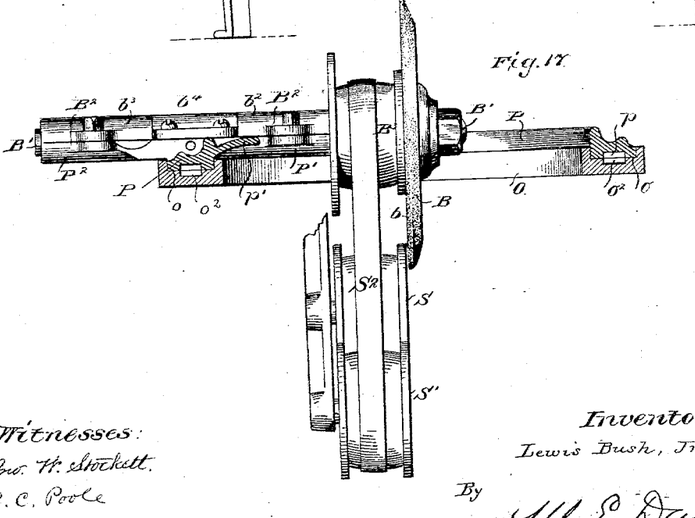
Fig. 17 is a section illustrating a modified construction in the ring for supporting the grinding-disk.

A preferred construction in the parts for supporting the bearings of the grinding-disk is illustrated in Fig. 17, in which the ring P is located upon the side of the ring O opposite to that at which the idlers are located, the effect of this construction being that the tension of the belts upon the driving-pulley tends to draw the ring P against its annular bearing-surface upon the ring O, instead of against the comparatively small bearing-surface formed by the segmental plates O′, as in the construction first described.

Figure 4:
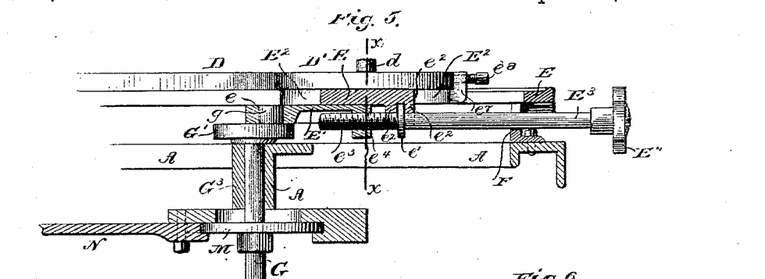
Fig. 4 is a vertical section of the machine, taken upon line $x\,x$ of Fig. 2.

For the purpose of holding the marginal portion of the saw from vertical movement under the action of the grinding-disk, a guide arm or stop, C′, Figs. 2 and 4, is provided, said guide preferably having in its end a vertically-arranged set-screw, $c'$, which bears upon the under side of the saw, whereby the surface of contact of the guide with the saw may be adjusted vertically, as desired.

Figure 18:
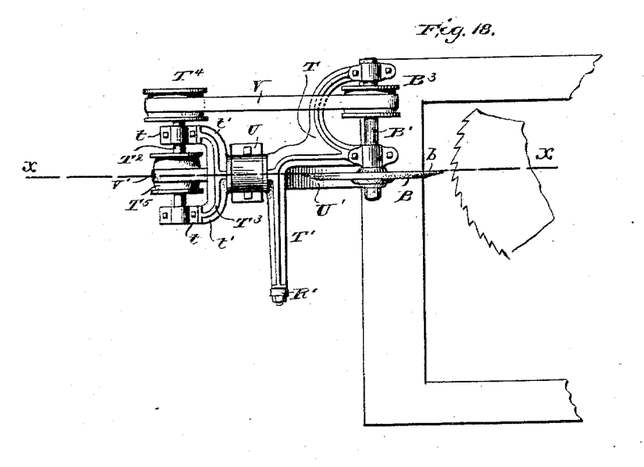
Fig. 18 is a plan view of a modified form of the support for the grinding-disk.
Figure 19:
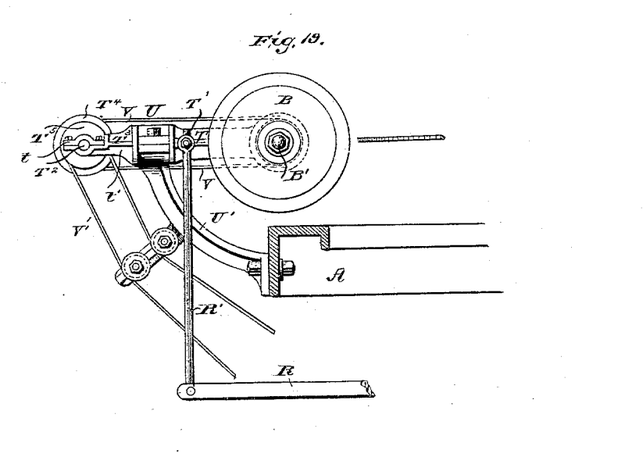
Fig. 19 is a side view of the device shown in Fig. 18.

Another device for mounting the grinding-disk in a manner to permit its movement with reference to the saw, as above set forth, is illustrated in Figs. 18 and 19. In this case the arbor B′ of the grinding-disk is mounted in suitable bearings in a bearing-box, U, upon an arm, U′, secured to the bed-plate A. The pivotal axis of the frame is, as shown, in the same horizontal plane with the saw and the axis of rotation of the grinding-disk, the box U being upon the side of said disk diametrically opposite to the point of contact of said disk with the periphery of the saw. The said frame is provided with an arm, T′, having connection with the lever R by means of a pitman, R′, similar to that before described, the said pitman operating to rotate said frame in its bearing U, so as to incline the disk at opposite angles with reference to the saw, as hereinbefore described.

The grinding-disk may be driven in the case last mentioned by means of a belt passing over a driving-pulley placed upon the disk-arbor close to the disk, as set forth in connection with the form of the device first described; or, as shown in the figures last referred to, a shaft, $T^2$, may be mounted in a part, $T^3$, of the frame T, extending beyond the bearing U, said shaft being provided with a pulley, $T^4$, located in the same plane with the corresponding pulley, $B^4$, upon the shaft B′, and having operative connection therewith by means of a driving-belt, V.

The shaft T² is preferably mounted in bearings t upon the ends of laterally-extended arms t', and the said shaft is driven by means of a pulley, T³, placed upon the shaft between the said bearings, with its center in line with the pivotal axis of the frame T and the grinding-face of the disk, said pulley being operated by means of a driving-belt, V', from the pulley H², before referred to, or from any other suitable driving-pulley.

By locating the driving-pulley T⁵ with its median plane in the same vertical plane with the axis of the frame T, and by giving the said pulley a curved surface, as shown, the rotation of the frame will produce no appreciable effect upon the driving-belt, and a perfect operation of said belt upon the pulley is obtained in whatever direction it is extended from the said pulley.

In saw-grinding machines as heretofore usually constructed the saw has been hung in a vertical plane, and the grinding-disk has been placed either above or below the saw. This construction has necessitated making the frames of different sizes for saws which vary considerably in diameter, and in case of large saws the frame has necessarily been made of inconvenient size and weight, in order to properly support the saw and permit the requisite motion therein.

By locating the saw horizontally above the frame of the machine, as shown in the drawings and above described, the center of the saw may be placed at any distance desired from the grinding-disk, and the frame may in all cases be made of compact form and of any height that is found convenient. An advantage is also gained by mounting the saw horizontally, for the reason that the saw, when so mounted, is moved horizontally in reciprocating it with reference to the grinding-disk, so that the weight of the saw is not lifted in so reciprocating it, and much less power, especially in sharpening large and heavy saws, on this account is needed to actuate the machine.

The adjustment of the saw with reference to the grinding-disk in placing it upon the machine is also much more readily effected in the construction shown than with a vertically-arranged saw, for the reason that, the weight of the saw in such case being supported upon the arm D, its center-pin may be readily shifted upon said arm and clamped in a desired position, and it not being necessary to lift the saw in moving the said arm, the latter may be more readily rotated in adjusting it upon the frame.

In machines in which the saws are supported in a vertical position it has been found that the weight of the saw upon the center-pin causes the latter to be worn out of true, especially when it becomes necessary to support saws of considerable size and weight in this manner. This difficulty is entirely obviated by supporting the saws horizontally, the weight of the saw in such case resting upon an annular bushing or ring adjacent to the eye of the saw, so that it has no tendency to cut or wear the bearing-pin.

Instead of moving the grinding-disk relatively to the saw as each tooth is brought in succession to the grinding-disk, so as to bevel the alternate saw-teeth in opposite directions, as hereinbefore set forth, it is obviously possible to produce the same result by first grinding the alternate teeth with the disk located at one angle with reference to the saw, and then reversing the position of said disk and grinding the remaining teeth with a bevel in the opposite direction.

In the use of grinding devices operating as last above described, in connection with a machine having devices for reciprocating and rotating the saw, the feed devices for rotating the saw will be arranged to move the periphery of the saw through a space covered by two teeth at each movement thereof, and the saw will therefore make two complete rotations in order to grind all of the teeth. In the operation of such machine the grinding-disk will be held in one position during one rotation of the saw, so as to bevel the alternate teeth in one direction, and the inclination of the disk will then be reversed and the unground teeth thereby beveled in the opposite direction during the second rotation of the saw.

The mode of operation in the grinding devices above set forth may be carried out in the machine shown and first above described by dispensing with the cam Q and the lever R, when the ring P may be moved by hand so as to change the position of the grinding-disk after each rotation of the saw. In this case a suitable clamp or stop of any familiar construction is applied to hold the ring immovable during the operation of grinding the alternate teeth with a bevel in one direction. The feeding device for rotating the saw would also be modified in the case last mentioned in order to increase the amplitude of the reciprocatory movement of the feed-finger I, so as to feed two teeth at a time; but such change in the feed devices does not render necessary any change in the principles of construction or operation of said feed devices.

I claim as my invention—

1. The combination, in a saw-sharpening machine, of a saw-support, a rotating grinding-disk and disk-arbor, and a rotatable frame affording bearings for the disk-arbor and mounted upon the machine-frame with its axis of rotation in the same plane with the saw, and in alignment with a point in the grinding-face of the disk, substantially as and for the purpose set forth.

2. The combination, with the frame of a saw-sharpening machine, means, substantially as described, for supporting a saw in horizontal position thereon, and a grinding-disk and its arbor, of a rotatable frame mounted upon the machine-frame and constructed to afford bearings for the arbor, a pulley mounted upon the said arbor, idlers S and S', mounted upon the machine-frame horizontally in line with the driving-pulley, and a belt passing over a suitably-located driving-pulley for actuating the pulley upon the arbor, substantially as and for the purpose set forth.

3. The combination, with a rotary grinding-disk and disk-arbor, means, substantially as described, for supporting a saw, means, substantially as described, for reciprocating the saw with reference to the grinding-disk, and feed mechanism, substantially as described, for rotating the saw, of an annular ring or frame, P, constructed to afford bearings for the grinding-disk arbor, and mounted in suitable guides upon the frame of the machine, so as to oscillate in a vertical plane, and having its axis of oscillation in line with the center of the grinding-disk, and intermediate driving-connections, substantially as described, between said frame and the mechanism for reciprocating the saw, constructed to oscillate the frame, substantially as and for the purpose set forth.

4. The combination, with the machine-frame, means, substantially as described, for supporting a saw thereon, means, substantially as described, for reciprocating the saw, a grinding-disk, and a disk-arbor, of a ring, P, constructed to afford bearings for the disk-arbor, a frame, O, constructed to support said ring, a pulley, B³, mounted upon the said arbor adjacent to the grinding-disk, and belt-connections, substantially as described, for operating said pulley, substantially as described.

5. The combination, with the machine-frame, means, substantially as described, for supporting a saw, and means, substantially as described, for reciprocating the saw, of a grinding-disk and disk-arbor, a pulley upon said arbor adjacent to the grinding-disk, a ring, P, affording bearings for the disk-arbor, an annular frame, O, supporting said ring, idlers S and S', mounted upon the machine-frame at the side of the frame O remote from the ring P, and a driving-belt passing from a suitable driving-pulley over said idlers to the pulley upon the grinding-disk arbor, substantially as and for the purpose set forth.

6. The combination, with the machine-frame and a grinding-disk, of a sliding plate, E, suitable guides for said plate upon the machine-frame, a support for the saw adjustably attached to the plate E, a vertical shaft, G', provided with a crank-pin, g, having operative connection with said plate, and means, substantially as described, for actuating said shaft, substantially as and for the purpose set forth.

7. The combination, with the machine-frame and a grinding-disk, of a sliding plate, E, supported in suitable guides upon the machine-frame, an arm, D, pivoted at one end to said plate, a clamping device for holding said arm in a desired position with reference to said plate, a clamping device for supporting the saw adjustably attached to said arm, a vertical shaft, G, provided with a crank-pin, g, having operative connection with said plate, and means, substantially as described, for rotating said shaft, substantially as described.

8. The combination, with the machine-frame, the sliding plate E, supported upon suitable guides upon the frame, and a support for the saw attached to said sliding plate, of a plate, E', connected with said plate E and adjustable longitudinally with reference to the latter, a vertical shaft, G, provided with a crank-pin, g, having operative connection with said plate E', and means, substantially as described, for rotating said shaft G, substantially as and for the purpose set forth.

9. The combination, with a grinding-disk and means, substantially as described, for supporting a saw, of a feed-finger, I, constructed to engage the periphery of the saw, an arm, J, pivoted to the machine-frame and constructed to support said feed-finger upon its free end, a sliding form-block, K, means, substantially as described, for reciprocating said form-block, and a spring or weight applied to retain the free end of the arm J in contact with the form-block during its reciprocatory movement, substantially as described.

10. The combination, with the machine-frame, a grinding-disk, and means, substantially as described, for supporting a saw, of a feed-finger, I, an arm, J, pivoted to the machine-frame and constructed to support said feed-finger upon its free end, a sliding plate, L, having bearings upon the machine-frame, a form-block, K, adjustably connected with the said sliding plate, means, substantially as described, for reciprocating the sliding plate, and a spring or weight applied to retain the free end of the said arm J in contact with the form-block, substantially as described.

11. The combination, with the machine-frame, a grinding-disk, means, substantially as described, for supporting the saw, and means, substantially as described, for reciprocating the saw with reference to the grinding-disk, of an arm, J, pivoted upon the top of the bed-plate of the machine-frame, provided with lateral extensions J² and J³, having downwardly-projecting portions j² and j³, constructed to rest upon the bed-plate, a sliding plate, L, upon said bed-plate beneath said arm, a form-block, K, adjustably connected with said plate L and constructed to engage the projection J' upon said arm, and means, substantially as described, for reciprocating said plate L, substantially as set forth.

12. The combination, with the machine-frame, a grinding-disk mounted thereon, and means, substantially as described, for supporting and reciprocating a saw, of an arm, J, pivoted to the bed-plate A of the machine-frame, a feed-finger, I, pivoted to the free end of said arm J, a sliding plate, L, having bearings upon said plate A, a form-block, K, connected with the plate L and constructed to engage the free end of said arm J, a pitman, N, connected with said plate L, a rotating shaft, G, and means, substantially as described, upon said shaft constructed to operate said pitman, substantially as set forth.

13. The combination, with the machine-frame, a saw-support, a grinding-disk, and a disk-arbor, of a rotatable frame affording bearings for said arbor, said frame being supported in bearings upon the machine-frame and constructed to rotate about an axis lying in the grinding-face of the disk, a driving-shaft, G, mounted in the machine-frame, a cam, Q, upon said shaft, provided with vertically-separated cam-grooves $q$ and $q'$, crossing each other at one point in the circumference of the cam, a lever, R, provided with a pivoted button constructed to engage the said cam-grooves and connected with the said frame, and means, substantially as described, for actuating the shaft G, substantially as set forth.

In testimony that I claim the foregoing as my invention I affix my signature in presence of two witnesses.

LEWIS BUSH, JR.

Witnesses:
C. CLARENCE POOLE,
JESSE COX, JR.